United States Patent
Plewicki et al.

(10) Patent No.: US 9,385,502 B1
(45) Date of Patent: Jul. 5, 2016

(54) METHOD AND APPARATUS FOR ADJUSTING PULSE PARAMETERS IN A SOLID-STATE CHIRPED-PULSE AMPLIFIER SYSTEM

(71) Applicant: Coherent, Inc., Santa Clara, CA (US)

(72) Inventors: Mateusz Plewicki, Sunnyvale, CA (US); Jean-Marc Heritier, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 14/615,190

(22) Filed: Feb. 5, 2015

(51) Int. Cl.
*H01S 3/00* (2006.01)
(52) U.S. Cl.
CPC ............. *H01S 3/0057* (2013.01); *H01S 3/0085* (2013.01)
(58) Field of Classification Search
CPC ...... H01S 3/0057; H01S 3/005; H01S 3/2308
USPC .......................................................... 359/337
See application file for complete search history.

(56) References Cited

U.S. PATENT DOCUMENTS

| 5,329,398 | A | 7/1994 | Lai et al. |
|---|---|---|---|
| 6,603,600 | B2 * | 8/2003 | Pang ........................ H01S 3/235 359/333 |
| 8,077,749 | B2 | 12/2011 | Shah |
| 8,462,427 | B2 | 6/2013 | Li |
| 8,780,440 | B2 | 7/2014 | Bayramian et al. |

* cited by examiner

*Primary Examiner* — Mark Hellner
(74) *Attorney, Agent, or Firm* — Morrison & Foerster LLP (57) ABSTRACT

Optical apparatus for amplifying pulses in a pulsed laser-beam includes a pulse-stretcher having a single transmission-grating in a multi-pass configuration at a non-normal incidence angle. A regenerative amplifier amplifies stretched pulses in the laser-beam. A pulse-compressor including two spaced-apart reflection-gratings in a multi-pass configuration compresses the amplified pulses. Pulse-parameters of the compressed amplified pulses are optimized by iteratively adjusting the incidence angle of the pulsed laser-beam on the transmission-grating of the pulse-stretcher and the spacing between the reflection-gratings of the pulse-compressor.

17 Claims, 6 Drawing Sheets

METHOD AND APPARATUS FOR ADJUSTING PULSE PARAMETERS IN A SOLID-STATE CHIRPED-PULSE AMPLIFIER SYSTEM

TECHNICAL FIELD OF THE INVENTION

The present invention relates in general to solid-state ultrafast laser systems commonly referred to as chirped-pulse amplifier (CPA) systems. The invention relates in particular to methods of optimizing parameters of output pulses of CPA.

DISCUSSION OF BACKGROUND ART

Solid-state amplifiers include a mode locked-laser delivering seed-pulses to be amplified; a pulse-stretcher for temporally stretching the seed-pulses; an amplifier for amplifying the temporally stretched pulses; and a pulse-compressor for temporally compressing the amplified pulses. The amplifier may be a regenerative amplifier, which includes a resonator including an optical switch arranged to accept a pulse to be amplified then discharge the amplified pulse after a predetermined number of round trips in the resonator. The amplifier may also be a multi-pass amplifier wherein the beam is sent many times through the same amplifying medium by using small angular separations between passes. Typically the pulse-stretcher and the pulse-compressor include either a single reflective diffractive grating (grating) or a pair of reflection-gratings, with an optical path for the pulses being stretched or compressed making multiple non-normal incidences on the grating or gratings.

The primary mechanism for providing temporal stretching and temporal compression of pulses is group delay dispersion (GDD), which is the second derivative of the reflected phase. GDD is measured in units of femtoseconds squared ($fs^2$). Pulse-stretching involves adding positive GDD. Correspondingly, negative GDD provides pulse-compression. As output pulses become shorter, pulse-shape becomes dependent of third-order dispersion (TOD), and eventually fourth-order dispersion (FOD). TOD is measured in units of femtoseconds cubed ($fs^3$). FOD is measure in units of femto seconds to the power four ($fs^4$).

By way of example, for pulses having a duration of about 1000 femtoseconds (fs), only GDD need be controlled. For pulses having a duration of 100 fs, GDD and TOD need to be controlled. For pulses having a duration less than about 35 fs, GDD, TOD, and FOD need to be controlled.

Changes in GDD, TOD, and FOD occur, for example, when adjustments are made to a regenerative amplifier, particularly the number of round-trips, in such an amplifier. Such changes may be made, for example, for changing the power of pulses output from the CPA. These must be corrected and controlled for optimum performance. Another example of changes in the GDD, TOD and FOD occurs when an experimental setup is adjusted and additional optical components are added in the beam between the compressor and the final target. Windows for sealing a vacuum-chamber, and focusing lenses used to focus a beam to a tight spot are typical examples of these added experimental components.

In prior-art solid-state CPA apparatus, control of GDD is accomplished by adjusting the spacing between reflection gratings in the pulse-compressor. Control of TOD is accomplished by adjusting the incidence angle of radiation on the reflection-gratings of the compressor.

A problem with varying the grating incidence angles is that these reflection-gratings cannot be used with incidence at the Littrow angle. The Littrow angle is an incidence angle on a grating which gives an equal diffracted angle. There must be some difference, however, between the incident and diffracted angles to allow for input to be separated from output without beam clipping. Practically, the minimum difference in incidence-angle from the Littrow angle is about 6°.

An additional problem with varying the reflection-grating incidence angles comes from the large angular variation suffered by the diffracted beam. A result of this is that if the incidence angle change is too great, the corresponding deviation angle can change sufficiently that other beam-steering optics, such as retro-reflectors, for providing multiple grating incidences, must be realigned laterally or horizontally, to intercept the deviated beam.

This means that, for maximum convenience and flexibility the pulse-compressor must be provided with at least one rotation-stage for rotating a grating, a translation stage for changing grating spacing and other translation means for realigning beam steering optics cooperative with the gratings. This results in apparatus which is massive, complicated, and expensive. There is a need for a simpler method and apparatus for controlling GDD and TOD in solid-state CPA apparatus.

SUMMARY OF THE INVENTION

The present invention is directed to optical apparatus for amplifying a pulsed laser-beam. The apparatus includes a pulse-stretcher having a single transmission-grating in a multi-pass configuration at a non-normal incidence angle for temporally stretching pulses in the laser-beam, an amplifier for amplifying the temporally stretched pulses in the laser-beam, and a pulse-compressor including at least one reflection-grating in a multi-pass path configuration, for compressing the amplified temporally-stretched pulses. A method of optimizing parameters of the compressed amplified pulses comprises iteratively adjusting the incidence angle of the pulsed laser-beam on the transmission-grating of the pulse-stretcher, and the length of the multi-pass path in the pulse-compressor.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
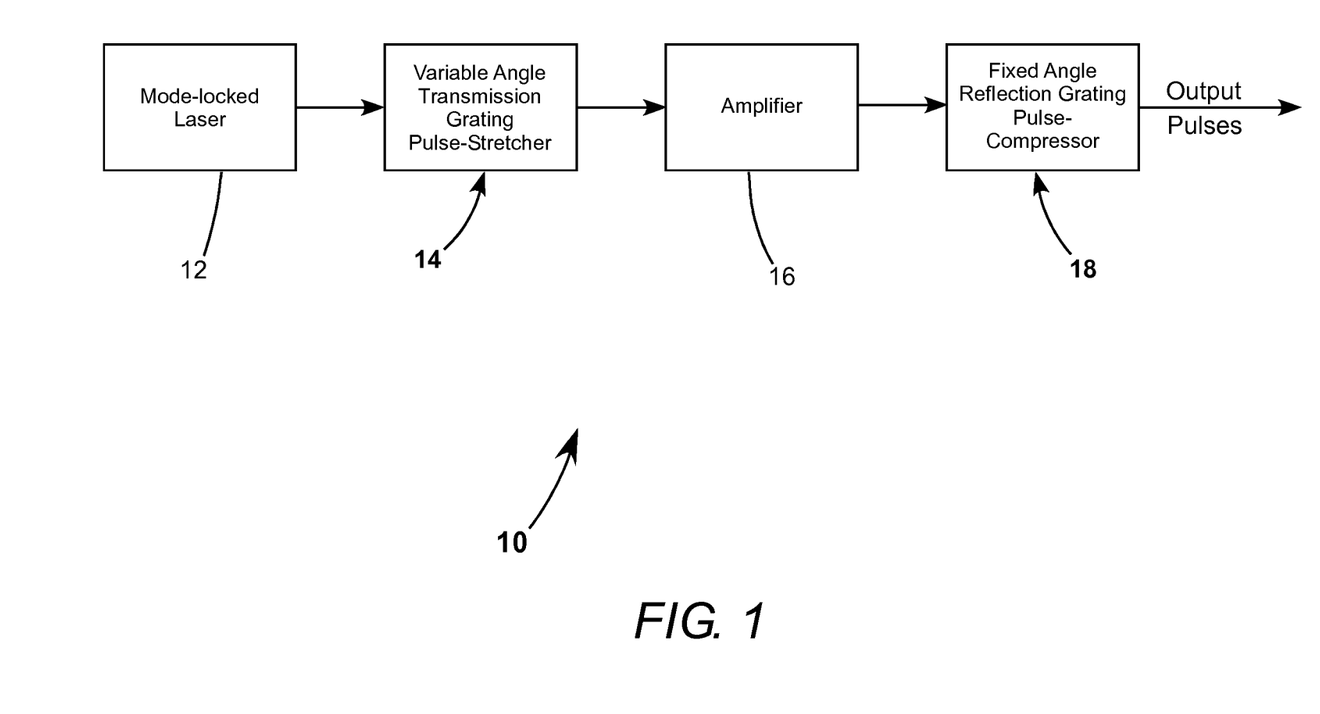
FIG. 1 is a block diagram schematically illustrating CPA apparatus in accordance with the present invention including a mode-locked laser for generating seed pulses to be amplified, a variable incidence angle transmission-grating pulse-stretcher for temporally stretching the seed pulses, an amplifier for amplifying the temporally stretched pulses, and a fixed-angle reflection-grating pulse-compressor for temporally compressing the amplified pulses.

Turning now to the drawings, FIG. 1 schematically illustrates, in block diagram form, a preferred embodiment 10 of chirped-pulse amplifier (CPA) apparatus in accordance with the present invention. Apparatus 10 includes a mode-locked solid state-laser 12, providing seed-pulses to be amplified. It is assumed for purposes of this description that this is a titanium-sapphire (Ti-sapphire) laser emitting pulses having a duration of about 15 fs, with a center wavelength tunable in wavelength range between about 790 and 810 nanometers (nm).

The seed pulses are delivered to a pulse-stretcher 14 in accordance with the present invention, which includes only a single transmission-grating. The pulse-stretcher temporally stretches the seed pulses to a duration of about 150 fs. The incidence angle of the pulses on the transmission-grating is selectively variable. A detailed description of a preferred arrangement of pulse-stretcher is presented further hereinbelow.

The temporally stretched seed pulses are delivered to an amplifier 16. Amplifier 16 may be a regenerative amplifier, as known in the art, which is an amplifier having an optical resonator including a solid state-gain element, Ti-sapphire in this example. In such an amplifier, as discussed above, a Pockels-cell based optical switch is included which admits a pulse into the resonator for amplification and ejects the amplified pulse after a predetermined number of round trips in the resonator. The number of round trips is selected, inter alia, according to the degree of amplification required. The number of round trips also affects pulse-parameters, because of dispersion of the pulse on each round trip. The greater the number of round trips, the greater the dispersion.

Alternatively, the amplifier may be a multi-pass amplifier using angular multiplexing to separate passes. While the dispersion of the amplifier is fixed in such an example, additional optical components added to the chirped-pulse amplifier such as windows or lenses will also affects pulse-parameters, because of dispersion of the pulse on these components It is pointed out here that a detailed description of laser 12 and amplifier 16 is not required for understanding principles of the present invention, accordingly, such a detailed description is not presented herein. Such lasers and amplifiers are available from commercial sources.

Following amplification in amplifier 16 the amplified pulses are delivered to a fixed incidence angle pulse-compressor 18 in accordance with the present invention. Pulse-compressor 18 may include two reflection-gratings or only one reflection-grating. In each case, the incidence angle of pulses on the grating is fixed. A detailed description of a two-grating compressor and a single-grating compressor is provided further herein below.

Figure 2:
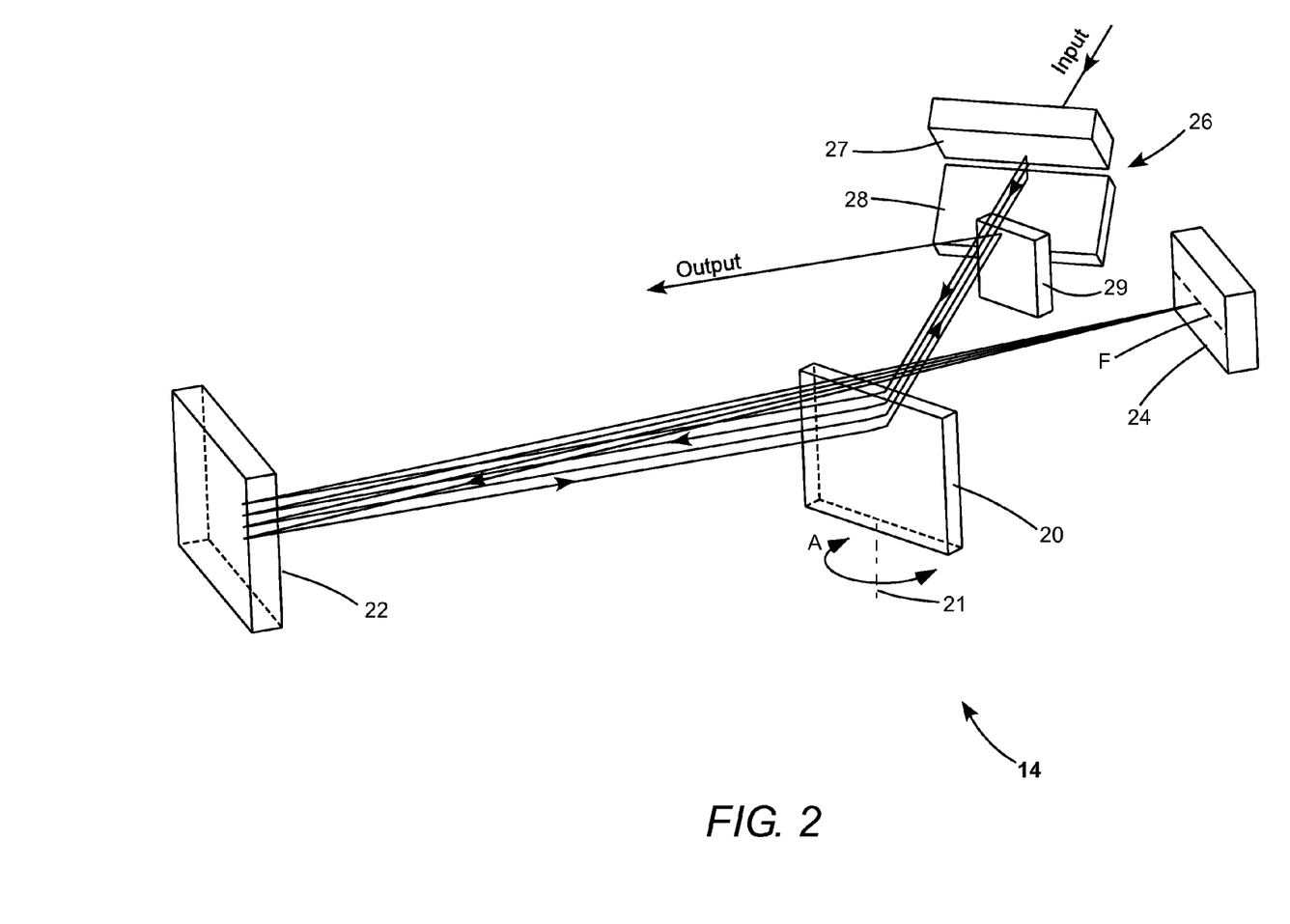
FIG. 2 is a three-dimensional view schematically illustrating a preferred arrangement of the pulse-stretcher of FIG. 1 including only one transmission-grating.

FIG. 2 schematically illustrates a preferred arrangement of pulse-stretcher 14 of FIG. 1. The pulse-stretcher includes a transmission-grating 20, selectively rotatable about a vertical axis 21 as indicated by arrows A. Such selective rotation may be accomplished by a stepper-motor-driven rotation stage (not shown), as is known in the art. A fixed concave focusing mirror 22 is cooperative with a fixed focal-plane mirror 24 located in the focal plane of mirror 22. The pulse-stretcher further includes a fixed retro-reflector 26, formed from vertically spaced-apart mirrors 27 and 28 inclined at 90° to each other, and a fixed pick-off mirror 29.

A pulse to be stretched is input between spaced apart mirrors 27 and 28. The input pulse (beam) passes over pick-off mirror 29, makes a first pass through grating 20 and is incident on focusing mirror 22. The reflected beam passes over grating 20 and is focused onto focal-plane mirror 24. The beam is then reflected from mirror 24 back onto mirror 22, below the original point of incidence Focusing mirror 22 directs the beam back through grating 20 on a second pass. Grating 20 directs the second pass beam back over pick-off mirror 29 to be incident on mirror 28 of retro-reflector 26. The beam is reflected upward onto mirror 27, which directs the beam back through grating to mirror 22 on a third pass. The beam then goes to mirror 24 and from mirror 24 back to mirror 22 at the lowest point of incidence on the mirror. Mirror 22 directs the beam back through grating 20 on a fourth pass therethrough. The beam is sufficiently down-shifted to be intercepted by pick-off mirror 29 which directs the beam (now a stretched pulse) out of pulse-stretcher 14.

It is pointed out here that the beam in FIG. 2 represents only one wavelength of a pulse which has a finite spectral bandwidth, for example about 30 nm full width at half-maximum (FWHM). This is done for simplicity of illustration. Other wavelengths within the bandwidth would be dispersed laterally by the grating, and would focus laterally along a line F on focal-plane mirror. It is also pointed out that the term "fixed" as used in this description and claims appended hereto, and applied to the mirrors in pulse-stretcher 14, allows that the mirrors can be held fixed in mounts (not shown) which allow some degrees of freedom of movement for initial alignment before the position and attitude is finally fixed.

Figure 2A:
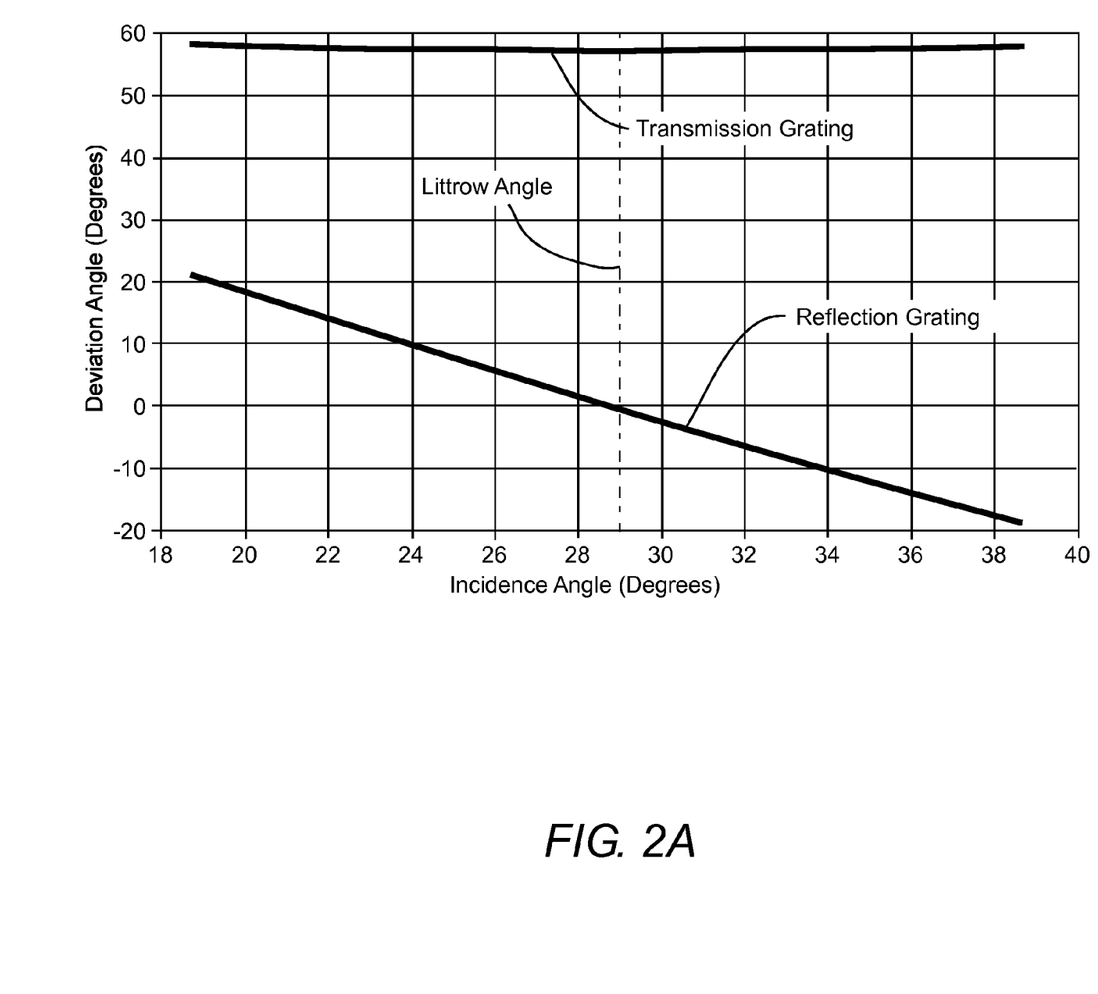
FIG. 2A is a graph schematically illustrating deviation angle as a function of incidence angle for the transmission-grating of FIG. 2 and a corresponding reflection-grating with the incidence angle varying plus and minus 10° about the Littrow angle.

The principal reason for selecting a transmission-grating for pulse-stretcher 14 is that the grating can be used with a nominal incidence angle equal to the Littrow angle which permits a relatively wide range of incidence angle change by rotating grating 20 as indicated with negligible change in deviation angle. This is illustrated in FIG. 2A, which is a graph schematically illustrating deviation angle as a function of incidence angle for the transmission-grating of FIG. 1 and a corresponding reflection-grating with the incidence angle varying plus and minus 10° about the Littrow angle, here assumed to be 29°.

The Littrow angle for a grating is an incidence angle at which the diffraction angle is equal to the incidence angle. The deviation angle for a reflection-grating is the difference between the incidence angle and the diffraction angle.

The deviation for a transmission-grating is the sum of the incidence angle and the diffraction angle. This provides that when a transmission-grating is operated in a range of incidence angles about the Littrow angle, there is very little change in the deviation angle which avoids the misalignment problems discussed in the background section above. In the graph of FIG. 2A, it can be seen that for a 20° total incidence-angle sweep, the deviation angle changes by only about 1° when a transmission-grating is used. For the reflection-grating the incidence angle change over the same 20°-sweep is about 40°.

It should be noted that the advantageous minimal change in deviation is achieved at the expense of some reduction of efficiency. By way of example, with incidence at the Littrow angle, 95% (less transmission-inefficiency losses) incident radiation goes into the diffracted beam (95% diffraction efficiency) with the remaining 5% in the zero order, but when the incidence angle is changed by 5°, the diffraction efficiency drops to 75%. The diffraction-efficiency difference, of course, is increased by multiple incidences on the grating; nevertheless it was determined that the difference could be readily compensated by the gain of the regenerative amplifier.

There will be small changes of the stretching factor (proportional to the positive GDD added or subtracted by the stretcher) due to the incidence-angle change on grating 20, but this is tolerable as far as the function of the stretcher is concerned, and can be corrected in the stretcher design to make sure a safe stretching is always maintained.

Figure 3:
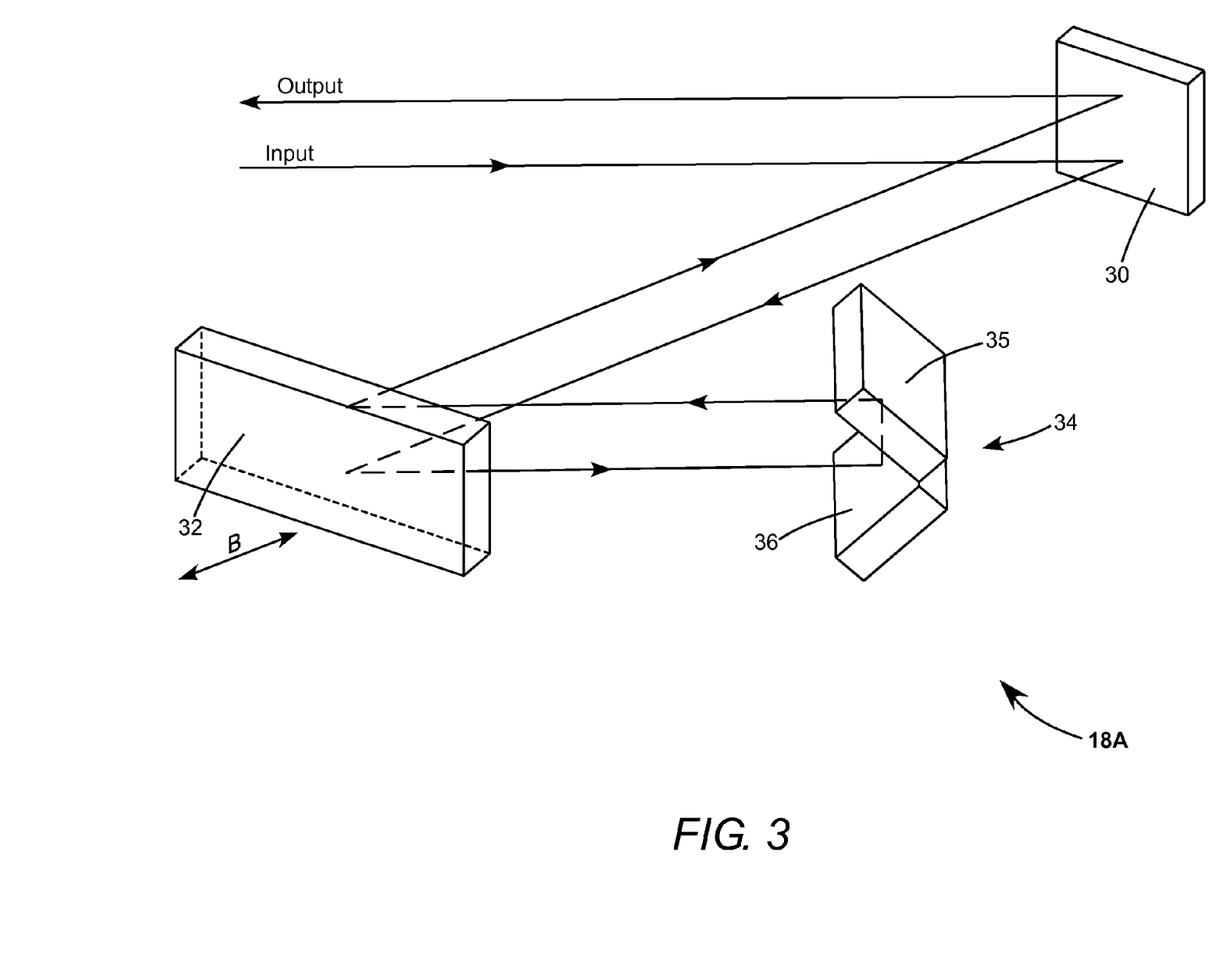
FIG. 3 is a three-dimensional view schematically illustrating one preferred arrangement of the pulse-compressor of FIG. 1, including two fixed incidence angle reflection-gratings.

FIG. 3 schematically illustrates one preferred arrangement 18A of a pulse-compressor in accordance with the present invention. Pulse-compressor 18A includes reflection-gratings 30 and 32 cooperative with a vertical retro-reflector 34 formed by mirrors 35 and 36 inclined at 90° to each other. An input pulse beam is first incident on grating 30 which diffracts (directs) the beam to be incident on grating 32. Grating 32 directs the beam to mirror 36 of retro-reflector which directs the beam vertically upward to mirror 35 of the retro-reflector. Mirror 35 directs the beam back to grating 32, which, in turn, directs the beam back to grating 30 which directs the beam out of the pulse-compressor as output (a compressed pulse). In the exemplary apparatus of this description, the duration of the compressed pulse would be about 35 fs. As in FIG. 2, only the path of a single wavelength is shown for simplicity of illustration. The incidence angle is the same on each grating.

Grating 32 is translatable in a direction parallel the beam incident on the grating, as indicated by arrows B, for changing the spacing between the gratings and accordingly the path length between successive grating incidences. This translation may be made by mounting the grating on a translation stage, not shown, as is known in the art. The translation of grating 32 would result in lateral displacement of the beam directed to retro-reflector 34, which must be made wide enough to accommodate such lateral displacement. Translation of grating 32, as illustrated, would not alter the spatial arrangement of the input and output beam-paths.

Figure 4:
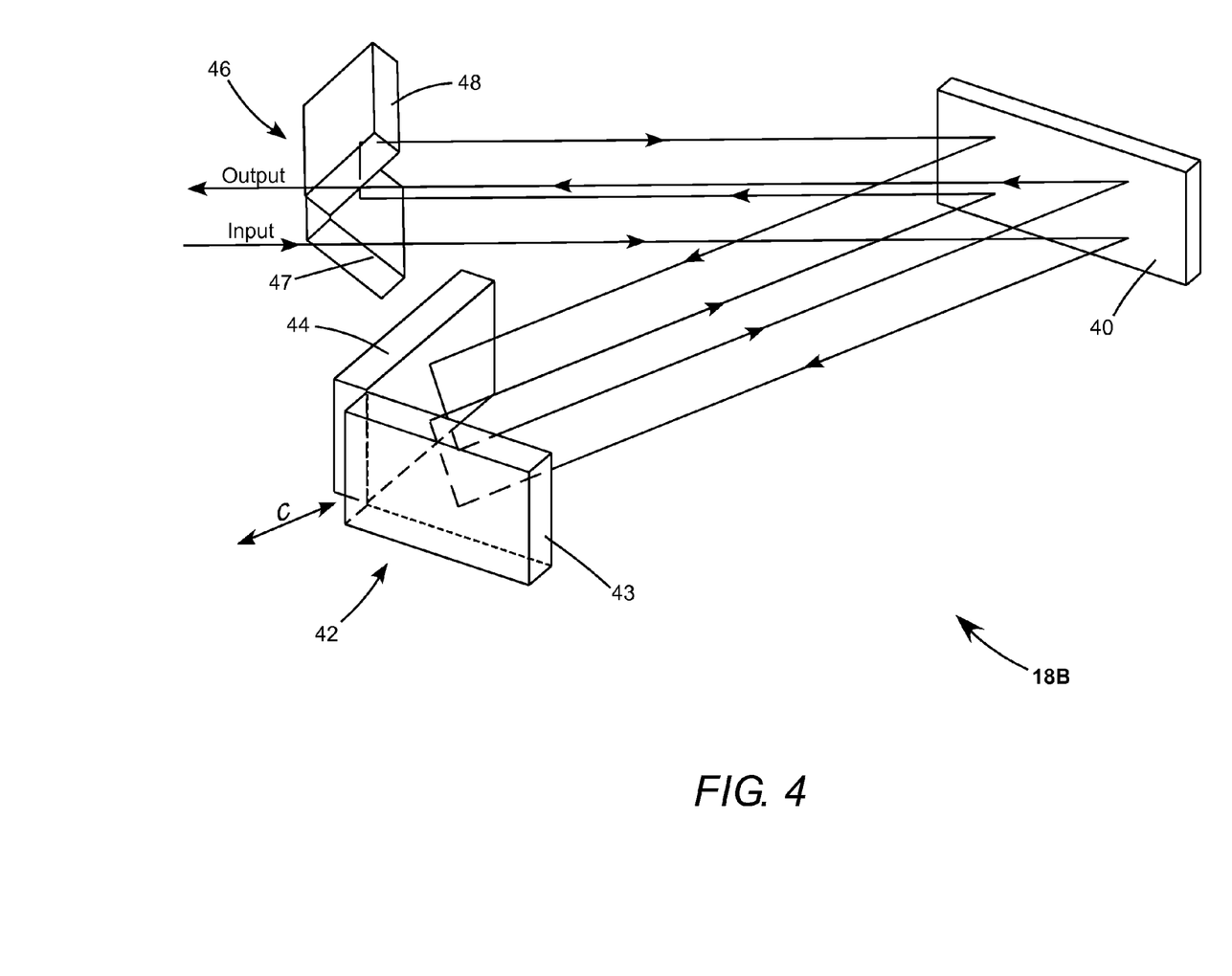
FIG. 4 is a three-dimensional view schematically illustrating another preferred arrangement of the pulse-compressor of FIG. 1, including only one fixed incidence angle reflection-grating.

FIG. 4 schematically illustrates another preferred arrangement 18B of a pulse-compressor in accordance with the present invention. Pulse-compressor 18B includes a single reflection-grating 40 cooperative with a lateral retro-reflector 42 formed by mirrors 43 and 44 inclined at 90° to each other, and a vertical retro-reflector 46 formed by mirrors 47 and 48 inclined at 90° to each other.

An input pulse (beam) is directed past retro-reflector 46 to grating 40 which directs the beam to lateral retro-reflector 42. Retro-reflector 42 re-directs the beam, laterally displaced, back to grating 40. Grating 40 directs the laterally displaced beam to vertical retro-reflector 46. Retro-reflector 46 reflects the beam, vertically displaced, back to grating 40. Grating 40 directs the vertically displaced beam back to lateral retro-reflector 42 for a second retro-reflection. Retro-reflector 42, on this second reflection laterally displaces the beam by an amount equal and opposite to the lateral displacement of the first-retro-reflection and directs the beam back to grating 40. Grating 40 directs the beam past retro-reflector 46 as output.

For changing the optical path between successive grating incidences, retro-reflector 42 is translated in the direction of the retro-reflected beams as illustrated by arrow C. Here again, the translation could be accomplished by mounting the chosen retro-reflector on a translation stage as is known in the art.

The purpose of path-length changing in either embodiment of the pulse-compressor is for correcting GDD. There may be some small change in TOD resulting from this, but this can be iteratively corrected by changing the incidence angle in the stretcher, allowing for rapid convergence on an optimum correction.

It should be noted here that the inventive iterative correction method is considered to be an adjustment of either the path length between grating incidences (grating spacing) in the pulse-compressor, or the incidence-angle on the transmission-grating of the pulse-stretcher. For any correction there will be a minimum of two iterations one for grating spacing in the pulse-compressor and one for incidence angle in the pulse-stretcher. A description of a pulse-shape change and subsequent correction is set-forth below with reference to FIG. 5.

Figure 5:
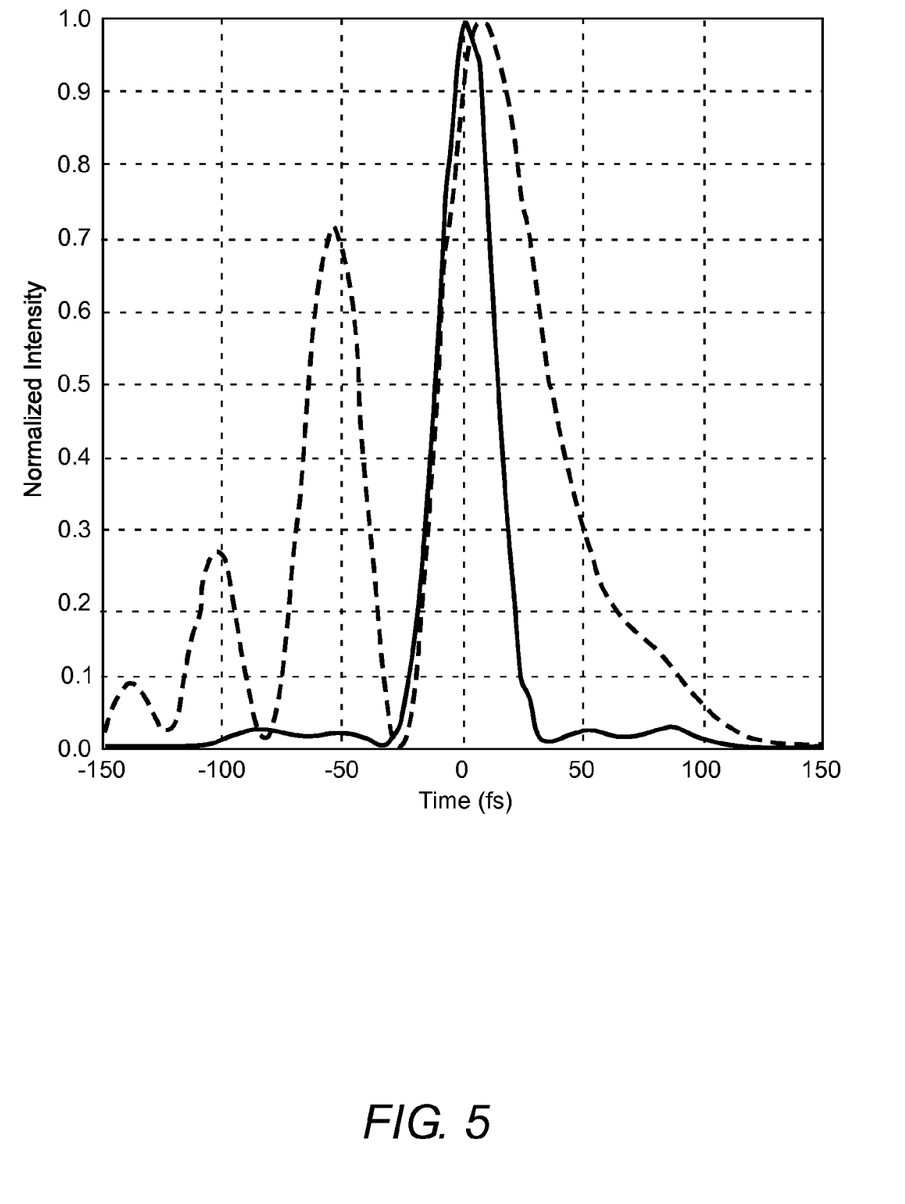
FIG. 5 is a graph of normalized intensity as a function of time for a previously optimized pulse distorted by changing the number of round trips in a regenerative amplifier, and a pulse re-optimized by the method of the present invention.

FIG. 5 is a graph of normalized measured intensity as a function of time for a previously optimized pulse distorted by changing the number of round trips in the regenerative amplifier (dashed curve) and corrected only by changing the spacing between the gratings in the compressor, and a pulse re-optimized by the method of the present invention (solid curve). The pulse-compressor was a two-grating compressor as depicted in FIG. 3, with a fixed incidence angle of 58.6°. The pulse-stretcher was configured as depicted in FIG. 2.

The pulse-shape distortion was introduced as a result of reducing the number of round-trips in the amplifier from 16 to 12 with a corresponding change in build-up time (BUT) in the amplifier from 166 ns to 126 ns. Prior to the iterative correction, the grating-spacing in the pulse-compressor had been adjusted to minimize GDD and was 314.88 mm. The incidence angle on the transmission-grating of the pulse-stretcher was 28.09°. TOD determined by curve-fitting was −53,900 $fs^3$. Following the iterative correction, the grating-spacing in the pulse-compressor was 310.23 mm and the incidence angle on the transmission-grating of the pulse-stretcher was 28.88°. TOD determined by curve-fitting was −2,300 $fs^3$. The pulse spectrum before and after correction had a FHWM bandwidth of 48.72 nm, for a Fourier (transform) limit of 25.2 fs. The measured FWHM width of the corrected pulse was 27.2 fs, i.e., 1.08 times the transform limit. In this instance, only two iterations were required for the correction, with the transmission-grating incidence angle changed first. It is recommended that the path length between incidences on a grating be changed first for any correction.

The present invention greatly simplifies CPA devices by distributing the pulse-shape correction and control functions between the pulse-stretcher and the pulse-compressor. GDD control is accomplished by changing the grating path-length in the pulse-compressor. TOD control is accomplished by changing the incidence angle on the grating of the pulse stretcher. This provides that only a single rotation stage is required in the pulse-stretcher and only a single translation stage is required in the pulse-compressor. By using fixed-angle reflection-gratings in the pulse-compressor, the need for realigning optical components during a correction is avoided. Realigning optical components in the pulse-stretcher is avoided by using a transmission-grating, with radiation incidence swept about the Littrow angle. FOD is not actively controlled in the present invention, but is minimized in the compressor design by selecting an appropriate nominal grating incidence angle.

A further advantage the inventive pulse-parameter correction method is that the transmission-grating in the pulse-stretcher can be smaller in size than the reflection-grating or gratings in the pulse-compressor. This is primarily due to the fact that the seed laser-beam is much smaller than the amplified beam. Seed pulses have much smaller energy than that of the amplified pulses. Large beams in the pulse-compressor are required to keep optical radiation fluence on optical components of the compressor below damage threshold. Selectively rotating a small grating in the pulse-stretcher is much simpler than rotating one or two large gratings in the pulse-compressor.

In summary the present invention is described above in terms of preferred embodiments. The invention is not limited, however, to the embodiments described and depicted herein. Rather, the invention is limited only by the claims appended hereto.

What is claimed is:

1. In optical apparatus for amplifying a pulsed laser-beam, the apparatus including a pulse-stretcher having a single transmission-grating in a multi-pass configuration at a non-normal incidence angle for temporally stretching pulses in the laser-beam, an amplifier for amplifying the temporally stretched pulses in the laser-beam, and a pulse-compressor including at least one reflection-grating in a multi-pass path configuration, for compressing the amplified temporally-stretched pulses, a method of optimizing parameters of the compressed amplified pulses, comprising:
    iteratively adjusting only the incidence angle of the pulsed laser-beam on the transmission-grating of the pulse-stretcher, and the length of the multi-pass path in the pulse-compressor in order to adjust the group delay dispersion (GDD) and the third order dispersion (TOD) of the compressed amplified pulses.

2. The method of claim 1, wherein the amplifier is a regenerative amplifier.

3. The method of claim 1, wherein the amplifier is a multi-pass amplifier.

4. The method of claim 1, wherein the pulse-compressor includes only one reflection-grating cooperative with a retro-reflector and the adjusting of the multi-pass path length is accomplished by adjusting the spacing between the retro-reflector and the reflection-grating.

5. The method of claim 4, wherein the reflection-grating position is fixed, and the retro-reflector is moved toward or away from the reflection-grating for making the multi-pass path-length adjustment.

6. The method of claim 1, wherein the pulse-compressor includes first and second spaced-apart reflection-gratings, and the adjusting of the multi-pass path-length is accomplished by adjusting the spacing between the first and second reflection-gratings.

7. The method of claim 6, wherein the position of the first reflection-grating is fixed and the second reflection-grating is moved toward or away from the first reflection-grating for making the multi-pass path-length adjustment.

8. The method of claim 1, wherein the incidence-angle adjustment of the transmission-grating is made within a range of angles about centered on the Littrow angle for the transmission-grating.

9. Optical apparatus for amplifying a pulsed laser-beam, the apparatus comprising:
    a pulse-stretcher having a single transmission-grating in a multiple-pass configuration at a non-normal incidence angle for temporally stretching pulses in the laser-beam, the transmission-grating being cooperative with a first plurality of reflective optical components for creating the multiple passes through the transmission-grating;
    an amplifier for amplifying the temporally stretched pulses in the laser-beam;
    a pulse-compressor for compressing the amplified temporally-stretched pulses, the pulse-compressor including a single reflection-grating cooperative with a second plurality of reflective optical components for providing an optical path for pulses being stretched, the optical path making multiple incidences on the reflection-grating;
    wherein the incidence angle on the transmission-grating of the pulse-stretcher is selectively variable for adjusting third order dispersion (TOD) in the compressed amplified pulses, and the position and attitude of the first plurality of reflective optical components is fixed; and
    wherein the length of the optical path in the pulse-compressor is selectively adjustable for adjusting group delay dispersion (GDD) in the compressed amplified pulses, with the incidence angle of the optical path on the grating being fixed.

10. The apparatus of claim 9, wherein the incidence-angle adjustment of the transmission-grating is made within a range of angles about centered on the Littrow angle for the transmission-grating.

11. The apparatus of claim 10, wherein the second plurality of optical components includes a retro-reflector spaced apart from the reflection-grating, and the selective adjustment of the optical path length in the pulse-compressor is accomplished by adjusting the spacing between the retro-reflector and the reflection-grating.

12. The apparatus of claim 11, wherein the position of the reflection-grating is fixed, and the selective adjustment of the optical path length in the pulse-compressor is accomplished by moving the retro-reflector toward or away from the reflection-grating.

13. The apparatus of claim 12, wherein the amplifier is a regenerative amplifier.

14. Optical apparatus for amplifying a pulsed laser-beam, the apparatus comprising:
    a pulse-stretcher having a single transmission-grating in a multiple-pass configuration at a non-normal incidence angle for temporally stretching pulses in the laser-beam, the transmission-grating being cooperative with a first plurality of reflective optical components for creating the multiple passes through the transmission-grating;
    an amplifier for amplifying the temporally stretched pulses in the laser-beam;
    a pulse-compressor for compressing the amplified temporally-stretched pulses, the pulse-compressor including a first and second spaced-apart reflection-gratings cooperative with a second plurality of reflective optical components for providing an optical path for pulses being stretched, the optical path making multiple incidences on each of the reflection-gratings;
    wherein the incidence angle on the transmission-grating of the pulse-stretcher is selectively variable for adjusting third order dispersion (TOD) in the compressed amplified pulses, and the position and attitude of the first plurality of reflective optical components is fixed; and
    wherein the length of the optical path in the pulse-compressor is selectively adjustable for adjusting group delay dispersion (GDD) in the compressed amplified pulses, with the incidence angle of the optical path on the reflection-gratings being fixed.

15. The apparatus of claim 14, wherein the incidence-angle adjustment of the transmission-grating is made within a range of angles about centered on the Littrow angle for the transmission-grating.

16. The apparatus of claim 15, wherein the selective adjustment of the optical path length in the pulse-compressor is accomplished by adjusting the spacing between first and second refection-gratings.

17. The apparatus of claim 16, wherein the amplifier is a regenerative amplifier.

\* \* \* \* \*